US009474033B2

(12) United States Patent
Gusavac et al.

(10) Patent No.: US 9,474,033 B2
(45) Date of Patent: *Oct. 18, 2016

(54) ADJUSTMENT OF TRANSMIT POWER PARAMETER

(71) Applicant: AT&T Mobility II LLC, Atlanta, GA (US)

(72) Inventors: Vladimir Gusavac, Atlanta, GA (US); Manish Vaishnav, Naperville, IL (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,118

(22) Filed: Nov. 5, 2015

(65) Prior Publication Data

US 2016/0066283 A1 Mar. 3, 2016

Related U.S. Application Data

(63) Continuation of application No. 14/547,029, filed on Nov. 18, 2014, now Pat. No. 9,210,669, which is a continuation of application No. 13/689,597, filed on Nov. 29, 2012, now Pat. No. 8,918,136.

(51) Int. Cl.
*H04B 7/00* (2006.01)
*H04W 52/34* (2009.01)
(Continued)

(52) U.S. Cl.
CPC ......... *H04W 52/346* (2013.01); *H04W 52/143* (2013.01); *H04W 52/16* (2013.01); *H04W 52/265* (2013.01); *H04W 52/365* (2013.01); *H04W 52/367* (2013.01)

(58) Field of Classification Search
CPC ............. H04W 52/24; H04W 52/346; H04W 52/241; H04W 52/04; H04W 52/26; H04W 52/325; H04W 52/367; H04W 52/265; H04W 52/16

USPC ................ 455/63.1, 67.13, 114.2, 517, 522, 455/550.1, 561

See application file for complete search history.

(56) References Cited

U.S. PATENT DOCUMENTS 5,487,180 A 1/1996 Ohtake
5,634,195 A 5/1997 Sawyer
(Continued)

OTHER PUBLICATIONS

Aurora Andujar Linares, "Auto-tuning of RRM Parameters in UMTS Networks. Feasibility Study" Master Thesis. Nov. 22, 2007, 129 pages.
(Continued)

*Primary Examiner* — Nhan Le
(74) *Attorney, Agent, or Firm* — Amin, Turocy & Watson, LLP

(57) ABSTRACT

Adjustment of a downlink transmit power parameter, such as a ceiling level, is disclosed. Signal-to-noise type information and committed power information can be employed to determine the ceiling level adjustment. A ceiling level can be a predetermined cap on transmission power for downlink channels between a user equipment and a base station. Where there is sufficient headroom in total transmission power and a power level greater than the predetermined ceiling can be effective, the ceiling can be adjusted to greater values than the predetermined value. Where total transmission power is more committed, ceiling adjustment can be prevented. Further, where there is no adequate benefit from increasing the ceiling, the adjustment of the ceiling can be prevented. While some instances can result in optimized transmission levels below the ceiling, instances can also be accommodated where the ceiling is to be increased.

20 Claims, 10 Drawing Sheets

(51) Int. Cl.
  *H04W 52/14* (2009.01)
  *H04W 52/36* (2009.01)
  *H04W 52/16* (2009.01)
  *H04W 52/26* (2009.01)

(56) References Cited

U.S. PATENT DOCUMENTS

| | | |
|---|---|---|
| 5,732,328 A | 3/1998 | Mitra et al. |
| 6,097,965 A | 8/2000 | Honkasalo et al. |
| 6,175,747 B1 | 1/2001 | Tanishima et al. |
| 6,934,268 B1 | 8/2005 | Hedlund et al. |
| 7,050,776 B2 | 5/2006 | Kim et al. |
| 7,869,405 B2 | 1/2011 | Rune |
| 7,890,130 B2 | 2/2011 | Sung et al. |
| 8,031,648 B2 | 10/2011 | Ishii et al. |
| 8,116,253 B2 | 2/2012 | Anderson |
| 8,145,252 B2 | 3/2012 | Sung et al. |
| 8,355,391 B2 | 1/2013 | Kashiwagi et al. |
| 8,918,136 B2* | 12/2014 | Gusavac ............ H04W 52/143 455/114.2 |
| 9,210,669 B2* | 12/2015 | Gusavac ............ H04W 52/143 |
| 2002/0004407 A1* | 1/2002 | Simonsson ......... H04W 52/343 455/522 |
| 2006/0293074 A1* | 12/2006 | Bottomley .......... H04W 52/322 455/522 |
| 2013/0310094 A1* | 11/2013 | Ho ..................... H04W 52/143 455/502 |

OTHER PUBLICATIONS

Notice of Allowance dated Aug. 19, 2014 for U.S. Appl. No. 13/689,597, 18 pages.
Notice of Allowance dated Aug. 6, 2015 for U.S. Appl. No. 14/547,029, 13 pages.
Office Action dated Apr. 10, 2015 for U.S. Appl. No. 14/547,029, 16 pages.

\* cited by examiner

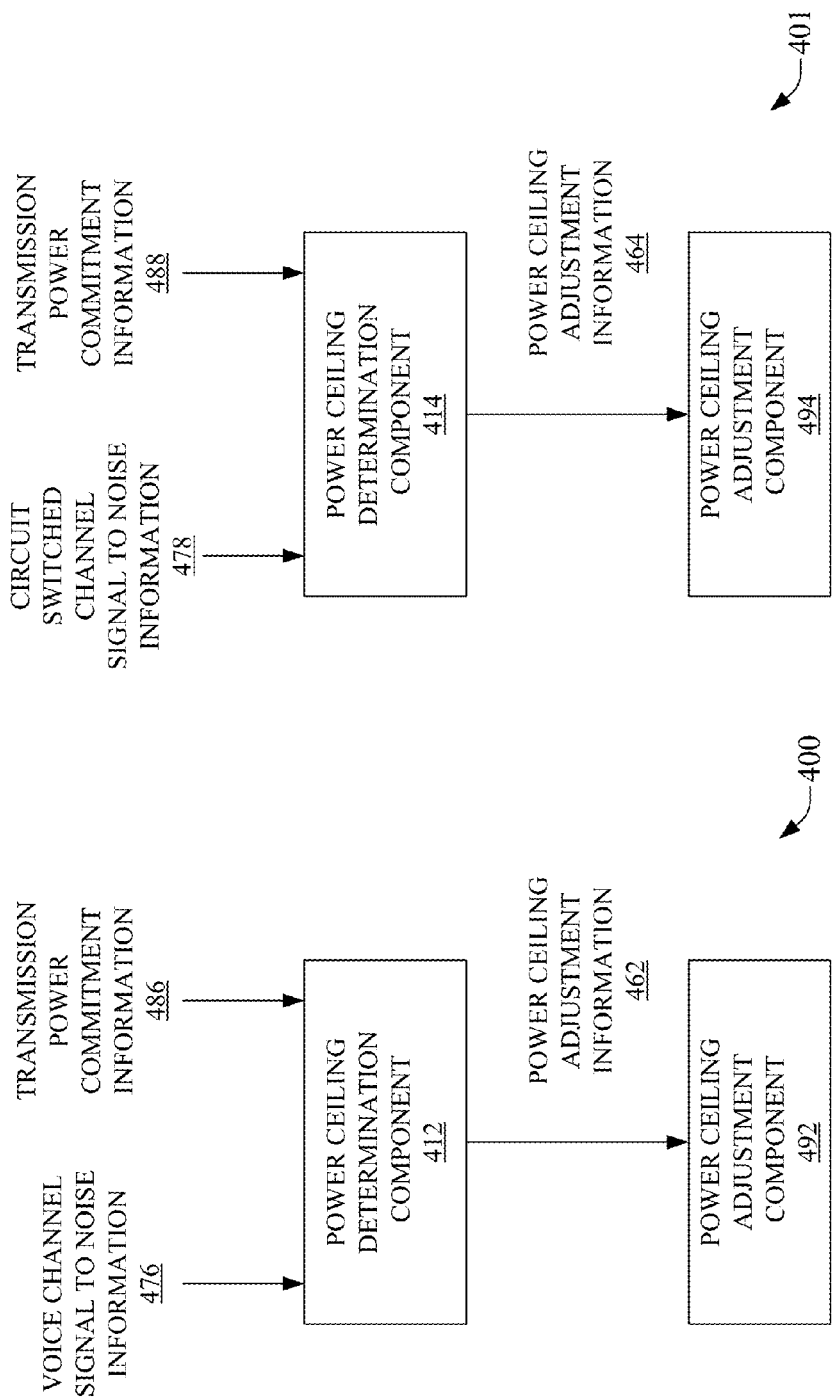

ers in accordance with aspects of the subject disclosure.

ADJUSTMENT OF TRANSMIT POWER PARAMETER

CROSS-REFERENCE TO RELATED APPLICATIONS

This application is a continuation of, and claims priority to each of, U.S. patent application Ser. No. 14/547,029, now U.S. Pat. No. 9,210,669, filed on Nov. 18, 2014, and entitled "ADJUSTMENT OF TRANSMIT POWER PARAMETER," which is a continuation of U.S. patent application Ser. No. 13/689,597, now U.S. Pat. No. 8,918,136, filed on Nov. 29, 2012, and entitled "ADJUSTMENT OF TRANSMIT POWER PARAMETER," the entireties of which are hereby incorporated by reference herein.

TECHNICAL FIELD

The disclosed subject matter relates to adjustment of a base station parameter, e.g., the adjustment of a downlink transmission power level parameter for a base station.

BACKGROUND

By way of brief background, the air interface between mobile devices and base stations can be associated with degradation of communication signals transmitted over the air interface. Degradation can be associated with signal attenuation, signal scattering, signal interferers, etc. As an example, signal attenuation can occur when a transmission signal passes between a mobile phone located in a concrete and steel building and a NodeB outside the building due to the signal being attenuated by the building materials. As a further example, signal degradation can occur when noise increases, such as other mobile devices transmitting nearby, making it more difficult to retrieve information carried by the transmitted signal between a mobile device and a base station. Degradation can also increase with the distance between a mobile device and a base station.

BRIEF DESCRIPTION OF DRAWINGS

FIG. 4 illustrates a system that facilitates generation of transmit power parameter adjustment information for a voice information channel in accordance with aspects of the subject disclosure.

FIG. 5 illustrates a system that facilitates generation of transmit power parameter adjustment information for a circuit-switched channel in accordance with aspects of the subject disclosure.

DETAILED DESCRIPTION

Figure 1:
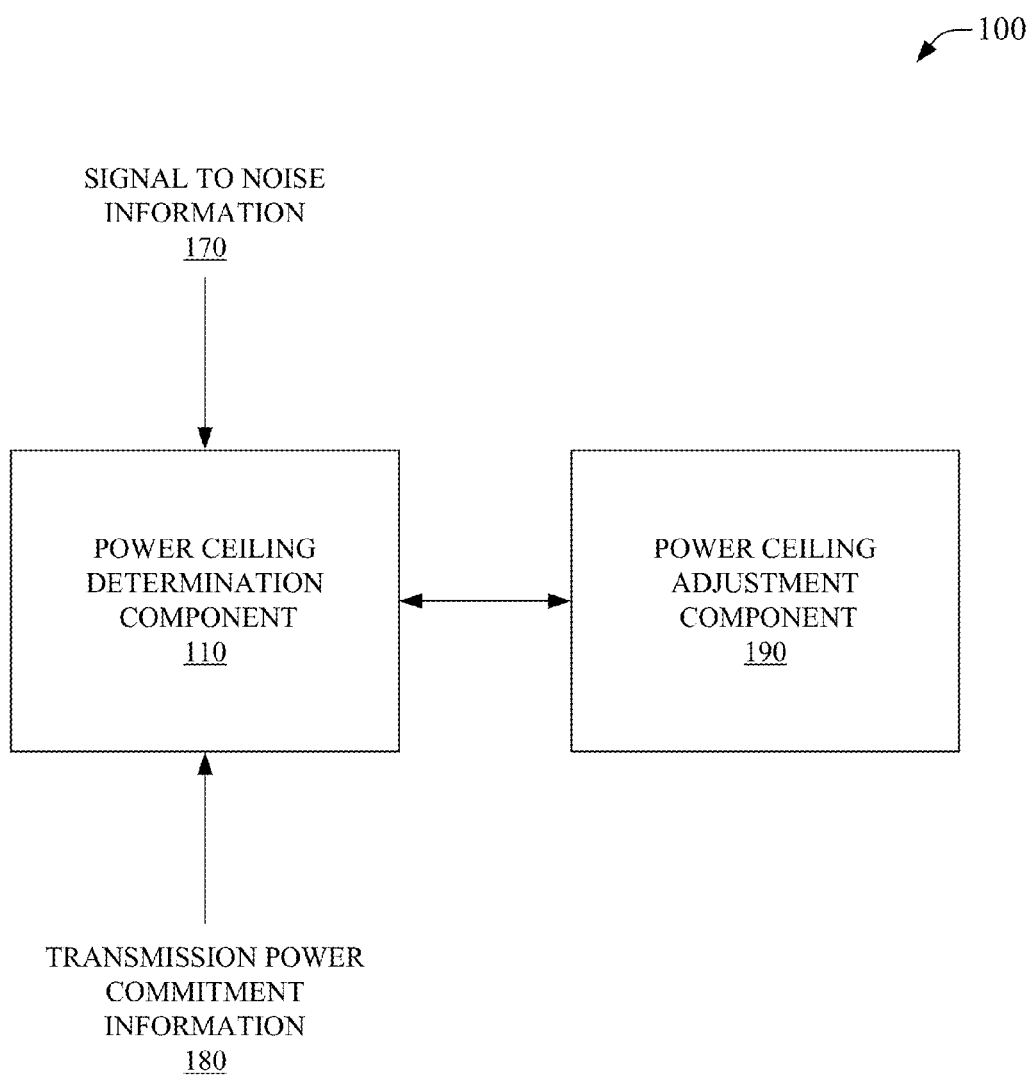
FIG. 1 is an illustration of a system that facilitates adjustment of a transmit power parameter in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, degradation can occur with respect to communication signals of the over the air interface. In this regard, mobile telecommunications providers, in some cases, can adjust the power level of transmissions between the mobile device and the base station to compensate for degradation of the signal. As an example, mobile devices in a handover can form a new communicative link with a base station at a predetermined power level that is sufficiently high to establish an effective link as a matter of probability for most air interface conditions. The transmit power of this link can then be adjusted to a lower and/or more efficient power level based on feedback information reflective of the actual air interface conditions. As such, where the mobile device is close to the base station and the air interface conditions are not suffering from amounts of degradation of communication signals, e.g., determined to satisfy a condition of defined "largeness", the power level can generally be decreased below the initial formation power level to increase efficiency given the improved conditions. Further, where the mobile device is far from the base station and the air interface conditions are poor, e.g., determined to satisfy a condition of defined "poorness", the power level can be decreased more moderately, if at all, to maintain the link in the poor conditions.

Accordingly, as described herein in various embodiments, instantiating and maintaining communicative links between mobile devices and base stations can include adaptation of an operating transmit power level for the uplink and downlink for the mobile device and the base station. Generally, environmental conditions of an air interface between a mobile device and a base station can impact the quality of the communication link. As such, where link quality is considered satisfactory, e.g., determined to satisfy a defined condition, transmit power can typically be reduced. In such a case, a mobile device consumes less power at lower transmit power levels, and reduced transmit power levels also generally reduce the significance of the transmitter as an interferer, e.g., lower transmission power levels correspond to a less noisy environment for other communicative links, etc. Conversely, where link quality is considered poor, transmit power levels generally can be increased to improve link performance. An increase in transmit power levels can increase signal strength relative to other environmental noise and allow a link to operate at a higher quality. However, increased transmit power levels for a link are associated with increased power consumption and increased effect as an interferer for other links in the air interface. Moreover, a base station, generally speaking, shares a finite amount of power for all communicative links between the base station and a plurality of mobile devices linked over the air interface to the base station. As such, increasing a transmit power level for a downlink between the base station and a mobile device reduces the amount of power available to other links between mobile devices and the base station.

As an example, base stations can designate a defined limit for a channel transmit power level that can be based on the total transmit power available to the base station. This defined limit is analogous to an adjustable 'ceiling', as used herein throughout. Ceiling power can, in some embodiments, be considered the same as, or similar to, maximum power per radio link, e.g., the maximum transmit power for a downlink channel between a base station and a mobile device. For instance, a ceiling transmit power level indicates a defined limit on allowable transmit power level when adjusting a transmit power level, e.g., a maximum allowable transmit power level or an upper limit to the allowable transmit power level. As such, the ceiling power level can be approximated as an immutable level, or set to a value within a defined range that approximates the ceiling power level. As an example, a universal mobile telecommunications system base station, e.g., NodeB, typically has a maximum output power of about 43 dBm or 46 dBm (20 or 40 watts), where 'dBm' is an abbreviation for the power ratio in decibels (dB) of the measured power, referenced to one milliwatt. A 'loading factor' can then be applied, for example, 50% or 75% of maximum output power. A defined maximum number of users can be determined, and can be based on the chip rate, an energy-to-noise value, anticipated interference factors, data rate, and the loading factor. The maximum number of users can also be determined by spreading-code space limitations. The per channel transmit power ceiling can be determined from the maximum output power, the loading factor, and the maximum number of users as will be appreciated by one of skill in the art. Transmission links are then generally not allowed to consume more power than that capped by the ceiling power level.

While some instances result in downlink transmission power levels that are much lower than the ceiling level, there can be circumstances where exceeding the instant ceiling power level can be beneficial, e.g., automatically adjusting the ceiling power level up can provide higher ceiling power levels under certain conditions. As an example, where there are relatively few downlinks between a base station and served mobile devices, representative of low utilization of available transmission power, and a served mobile device is in an environment associated with unusually high signal attenuation, incrementally increasing the per channel transmit ceiling level can facilitate downlink transmissions at higher power levels that can be sufficiently elevated to allow maintenance of the downlink connection to the served mobile device. This can serve to allow the downlink to be established and maintained in poor air interface conditions that would otherwise be unlikely to facilitate the downlink without ceiling power level adjustment. In an aspect, where there is low utilization of available power, the imposed ceiling may not reflect the actual usage of the air interface and dynamically adjusting the ceiling can allow for increasing actual transmit levels to facilitate downlink service to a mobile device that would otherwise be unlikely.

Automatically adjusting the downlink transmit ceiling level can be based on information relating to transmission power commitment. Transmission power commitment information can be related to the utilization of available transmit power, e.g., how much of the available transmit power is committed to established downlinks. As an example, a 20 W NodeB with a 50% loading factor can be associated with 10 W of available transmit power. Where, for example, 9 W of the 10 W are committed, e.g., associated with operable downlinks, it can be undesirable to allow an increase of the transmit power ceiling for a channel as it could result in total committed transmit power consumption exceeding the 10 W available.

Transmission power commit information can include information relating to the overall available transmit power, the loading factor, the available transmit power, the allocated transmit power, etc. This information can be employed to determine commitment information, such as, a ratio of committed to overall available transmit power. Automatic adjustment of a downlink transmit power ceiling level can then be based, in part, on the commitment information. As an example, adjustment of the ceiling can be permissible where less than 50% of available power is committed. As a further example, adjustment of the ceiling can be restricted where the ratio of available to committed power is greater than unity. As yet another example, decrementing the downlink transmit power ceiling can be enforced where the percentage of committed power exceeds 65%, e.g., where there is more than 65% committed power, any elevated ceiling levels can be actively reduced, such as to predefined ceiling levels. It is noted that numerous other rules relating to adjustment of the ceiling can be related to nearly any aspect of transmission commitment information and are considered within the scope of the presently disclosed subject matter despite not being explicitly recited for the sake of clarity and brevity. In an aspect, the ceiling can be adjusted where there is a need and where there is enough power available to fill that need.

In an embodiment, a system can include a processor and memory. The processor can facilitate the execution of instructions stored on the memory. The execution of the instructions can cause the processor to receive information related to signal conditions and noise conditions for a wireless communications channel associated with a base station device and a user equipment. The processor can further be caused to receive information related to power commitment conditions for the base station device. The processor can then determine an adjustment to a ceiling value related to a predetermined limit of a transmission power level for the wireless communications channel and facilitating access to that adjustment value.

In another embodiment, a method can include receiving, by a system including a processor, information related to signal conditions and noise conditions for a wireless downlink communications channel associated with a base station device and a user equipment. The method can also include receiving information related to power commitment conditions for the base station device. The method can allow for determining an adjustment to a ceiling value related to a predefined maximum transmission power level for the wireless downlink communications channel and facilitating access to said adjustment value by the base station device.

In a further embodiment, a computer-readable storage medium can include instructions that cause a processor to perform operations comprising receiving, at a base station device from a mobile device, information related to signal conditions and noise conditions for a wireless communications channel associated with the base station device and the mobile device. The operations can further include, receiving, at the base station device, information related to power commitment conditions for the base station device. The operations can then determine, at the base station device, an adjustment to a ceiling value related to a predetermined limit of a transmission power level for the wireless communications channel and facilitate access to the adjustment value by a component of the base station device associated with setting the transmission power level.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates adjustment of a transmit power parameter in accordance with aspects of the subject disclosure. System 100 can include power ceiling determination component 110 that can automatically determine adjustment of a downlink transmit ceiling level. Power ceiling determination component 110 can generate power ceiling adjustment information based on the determined adjustment to be made to a downlink transmit ceiling. In an aspect, this determination can be based, at least in part, on a determined performance of the downlink and a determined level of uncommitted power that can facilitate an adjustment of a downlink transmit power ceiling.

Power ceiling determination component 110 can receive signal-to-noise information 170. Signal-to-noise information 170 can include carrier-to-noise ratio information, signal-to-noise ratio information, Eb/N0 information (e.g., energy per bit relative to noise power spectral density), signal-to-interference information, Es/N0 information (e.g., energy per symbol relative to noise power spectral density), C/N0 information (e.g., carrier to receiver noise density), etc. Signal-to-noise information 170 can be employed to determine the performance of a signal, for example, signal-to-noise information 170 can facilitate determining the performance of a downlink between a base station and mobile device. Signal-to-noise information 170 can include metrics that, for example, can indicate that increasing the transmission power of a downlink transmission can improve the signal quality relative to signal interference.

Power ceiling determination component 110 can further receive transmission power commitment information 180. Transmission power commitment information 180 can include information related to base station utilization of available power for downlink transmissions. In an aspect, transmission power commitment information 180 can include metrics for total available power, total link budget power, total downlink transmit power, committed power, committed link budget power, committed downlink transmit power, available power, available link budget power, available downlink transmit power, etc. Transmission power commitment information 180 can facilitate determining a difference between total or available downlink transmit power and committed downlink transmit power. This difference can be referred to by the term 'headroom', as used herein throughout, referring generally to an amount still available before attaining a limit with respect to an amount consumed. In an embodiment, downlink transmit power headroom can represent the amount of uncommitted downlink transmit power available for a base station. As such, transmission power commitment information 180 can facilitate determining downlink transmit power headroom that can be committed by downlink channels allowed to exceed a predetermined ceiling power level.

Power ceiling determination component 110 can be communicatively coupled to power ceiling adjustment component 190. Power ceiling determination component 190 can facilitate adjustment of a downlink channel transmit ceiling level. Power ceiling determination component 190 can automatically adjust the downlink transmit ceiling level in response to a receiving power ceiling adjustment information.

As an example, power ceiling determination component 110 can determine that an increase in transmit power on a downlink channel has a sufficiently high probability of improving downlink performance. The power ceiling determination component 110 can further determine that there is sufficient power headroom to facilitate exceeding the predefined downlink power ceiling level. In response to these determinations, power ceiling determination component 110 can generate power ceiling adjustment information. This power ceiling adjustment information can be received, for example, at power ceiling adjustment component 190. In response to receiving power ceiling adjustment information, power ceiling adjustment component 190 can automatically adjust the power ceiling of the downlink. Automatically adjusting the power ceiling of the downlink channel can allow the downlink to transmit at a higher power level. Where the downlink channel does increase transmit power in response to operating with an elevated power ceiling, the increase in transmit power can be reflected in an increase in committed power, an increase in interference as a result of the higher transmit power (e.g., as an interferer), an increase in the performance of the downlink channel (e.g., improved carrier-to-noise ratio, Eb/N0, etc.) due to the higher transmit power, etc. Where these changes impact signal-to-noise information 170 or transmission power commitment information 180, these changes can be reflected in future automatic determinations for adjusting the power ceiling of a downlink channel.

In an aspect, system 100 can be embodied in a base station or other radio access network component. In a further aspect, system 100 can be distributed between mobile devices and radio access network components. As an example, power ceiling determination component 110 can be part of a NodeB, part of a user equipment (UE), part of a deployed sensor, part of a personal access point, etc. As another example, power ceiling adjustment component 190 can be part of a NodeB, part of a radio network controller, etc.

Figure 2:
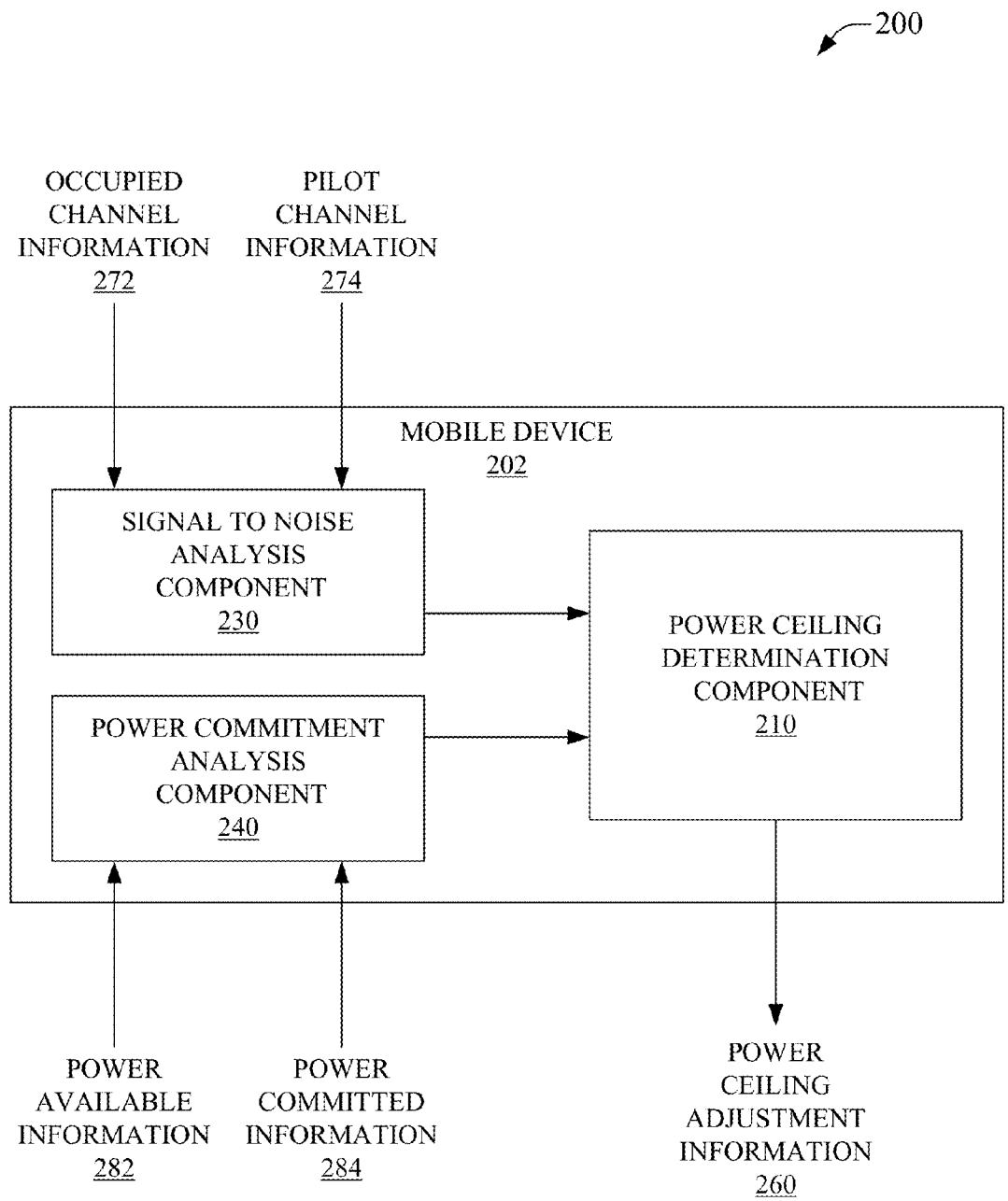
FIG. 2 is a depiction of a system that facilitates generation of transmit power parameter adjustment information at a mobile device based in accordance with aspects of the subject disclosure.

FIG. 2 is a depiction of a system 200 that can facilitate generation of transmit power parameter adjustment information at a mobile device in accordance with aspects of the subject disclosure. System 200 can include mobile device 202. Mobile device can 202 can include a smartphone, a cell phone, a laptop computer, a tablet computer, a navigation system, or any other mobile device. Further, mobile device 202 can be embodied in a mobile device employed in a non-mobile manner, such as a laptop computer housed in a fixed kiosk, a tablet computer affixed to a table, etc.

System 200 can include power ceiling determination component 210 that can automatically determine adjustment of a downlink transmit ceiling level. Power ceiling determination component 210 can generate power ceiling adjustment information based on a determined adjustment to be made to a downlink transmit ceiling. In an aspect, this determination can be based, at least in part, on a determined performance of the downlink and a determined level of uncommitted power that can facilitate an adjustment of a downlink transmit power ceiling.

Power ceiling determination component 210 can be communicatively coupled to signal-to-noise analysis component 230. Signal-to-noise analysis component 230 can determine signal-to-noise information, such as signal-to-noise information 170. Signal-to-noise information can be employed to determine the performance of a signal, for example, signal-to-noise information can facilitate determining the performance of a downlink between a base station and mobile device. Signal-to-noise information can include metrics that, for example, can indicate that increasing the transmission power of a downlink transmission can improve the signal quality relative to signal interference. Signal-to-noise information can be based on an analysis of relevant channel information.

Signal-to-noise analysis component 230 can receive occupied channel information 272. Occupied channel information 272 can include signal strength, quality metrics, etc., for an occupied channel, e.g., a downlink channel between a base station and mobile device 202. Signal-to-noise analysis component 230 can further receive pilot channel information 274. Pilot channel information 274 can include pilot signal strength, quality metrics, etc., for a pilot channel received from the base station by mobile device 202. In an aspect, pilot channel information can be associated with a common pilot channel, such as CPICH, which is a common pilot channel familiar to those of ordinary skill in the art. The common pilot channel can be a downlink channel broadcast by a NodeB at a constant power and with a known bit sequence. The downlink power level is generally between 5% and 15% of total transmit power for a Node B. Typically, common pilot channel power is set at 10% of the typical total transmit power. Thus where a NodeB typically has a total transmit power of 43 dBm, the common pilot channel can have a transmit power around 33 dBm. The use of a pilot channel allows for relative measurement, such as phase and power estimations, among other functions. Analysis of occupied channel information 272 relative to pilot channel information 274 can facilitate determination of signal-to-noise information.

Power ceiling determination component 210 can further be communicatively coupled to committed power analysis component 240. Committed power analysis component 240 can determine transmission power commitment information, such as transmission power commitment information 180. Transmission power commitment information can be employed to determine base station utilization of available power for downlink transmissions. Committed power analysis component 240 can receive power available information 282 that can include information related to total available power, available link budget power, available downlink transmit power, etc. Committed power analysis component 240 can further receive power committed information 284 that can include information related to total committed power, committed link budget power, committed downlink transmit power, etc. Committed power analysis component 240 can facilitate determining how much headroom remains in the downlink transmit power that can be shifted to downlink channels allowed to exceed a predetermined ceiling power level.

Power ceiling determination component 210 can determine that an increase in transmit power on a downlink channel has a sufficiently high probability of improving downlink performance. The power ceiling determination component 210 can further determine that there is sufficient power headroom to facilitate exceeding the predefined downlink power ceiling level. In response to these determinations, Power ceiling determination component 210 can generate power ceiling adjustment information 260. Power ceiling adjustment information 260 can be made available to other systems and components. In an aspect, power ceiling adjustment information 260 can be received, for example, at power ceiling adjustment component 190. Where power ceiling adjustment component 190 is communicatively coupled to a base station, it can facilitate automatically adjusting the power ceiling of a downlink in response to receiving power ceiling adjustment information 260. Automatically adjusting the power ceiling of the downlink channel can allow the downlink to transmit at a higher power level than would be allowed under conventional static power ceiling designation.

Figure 3:
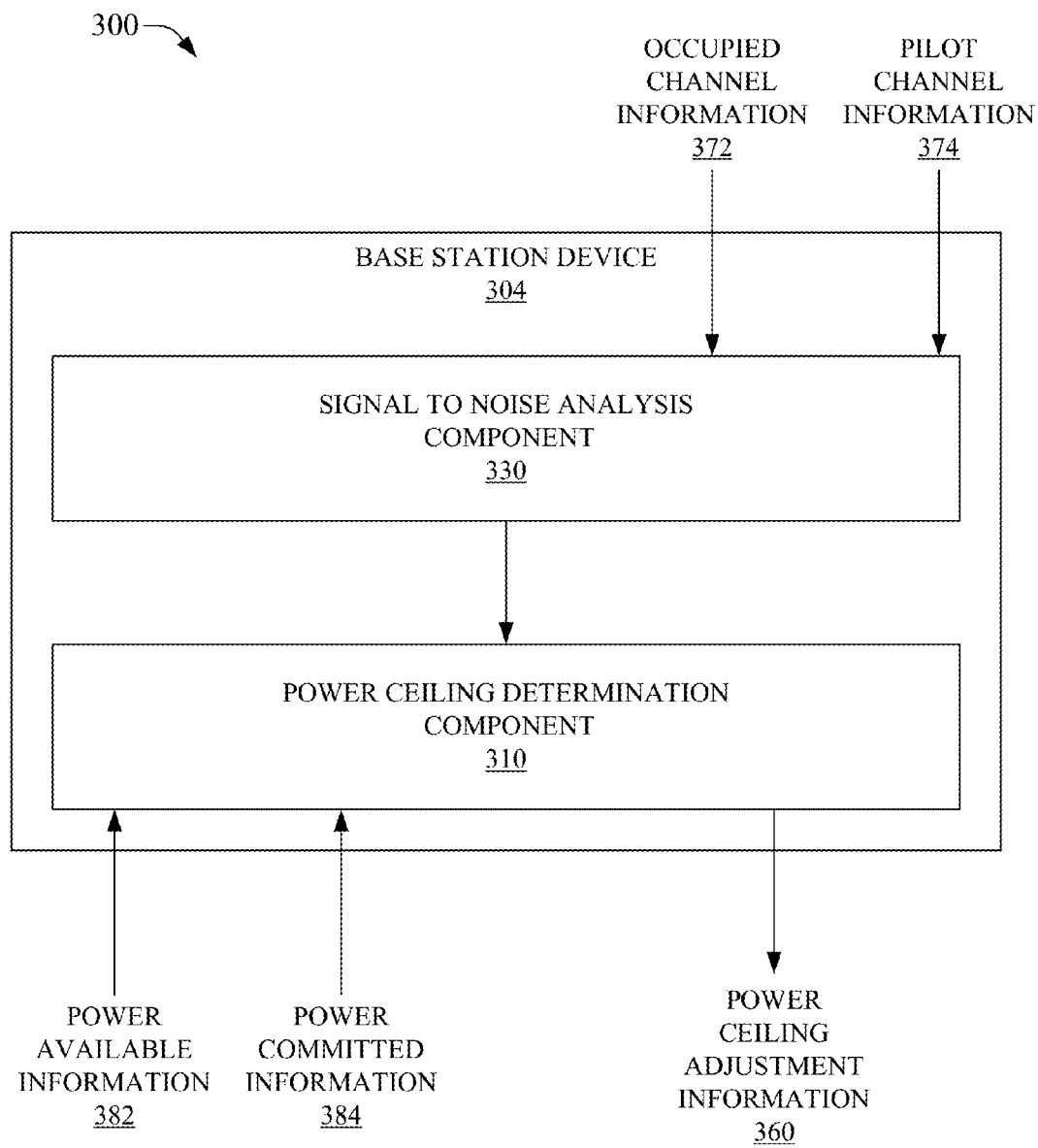
FIG. 3 illustrates a system that facilitates generation of transmit power parameter adjustment information at a base station device in accordance with aspects of the subject disclosure.

FIG. 3 illustrates a system 300 that facilitates generation of transmit power parameter adjustment information at a base station device in accordance with aspects of the subject disclosure. System 300 can include base station device 304. Base station device can 304 can include a NodeB, eNodeB, a wireless access point, a personal base station, etc., or components thereof. Further, base station device 304 can be embodied in a femtocell, picocell, microcell, etc.

System 300 can include power ceiling determination component 310 that can automatically determine adjustment of a downlink transmit ceiling level. Power ceiling determination component 310 can generate power ceiling adjustment information based on a determined adjustment to be made to a downlink transmit ceiling. In an aspect, this determination can be based, at least in part, on a determined performance of the downlink and a determined level of uncommitted power that can facilitate an adjustment of a downlink transmit power ceiling. Power ceiling determination component 310 can be communicatively coupled to signal-to-noise analysis component 330. Signal-to-noise analysis component 330 can determine signal-to-noise information, such as signal-to-noise information 170. Signal-to-noise information can be employed to determine the performance of a signal, for example, signal-to-noise information can facilitate determining the performance of a downlink between base station 304 and a mobile device. Signal-to-noise information can include metrics that, for example, can indicate that increasing the transmission power of a downlink transmission can improve the signal quality relative to signal interference. Signal-to-noise information can be based on an analysis of relevant channel information.

Signal-to-noise analysis component 330 can receive occupied channel information 372. Occupied channel information 372 can include signal strength, quality metrics, etc., for an occupied channel, e.g., a downlink channel between base station 304 and a mobile device. Signal-to-noise analysis component 330 can further receive pilot channel information 374. Pilot channel information 374 can include pilot signal strength, quality metrics, etc., for a pilot channel of base station 304, as received by a mobile device. Analysis of occupied channel information 372 relative to pilot channel information 374 can facilitate determination of signal-tonoise information. In an embodiment, signal-to-noise analysis component 330 can receive signal-to-noise information directly from a mobile device (not illustrated) rather than raw information to determine signal-to-noise information at signal-to-noise analysis component 330 (as illustrated).

Power ceiling determination component 310 can further receive power available information 382 that can include information related to total available power, available link budget power, available downlink transmit power, etc. Power ceiling determination component 310 can further receive power committed information 384 that can include information related to total committed power, committed link budget power, committed downlink transmit power, etc. Power ceiling determination component 310 can determine transmission power commitment information based, at least in part, on power available information 382 and power committed information 384. In an aspect, power ceiling determination component 310 can facilitate determining how much headroom remains in the downlink transmit power that can be shifted to downlink channels allowed to exceed a predetermined ceiling power level. In an embodiment, power ceiling determination component 310 can receive transmission power commitment information directly (not illustrated) rather than raw information to determine transmission power commitment information (as illustrated).

Power ceiling determination component 310 can therefore receive signal-to-noise information, e.g., from signal-to-noise analysis component 330, and can determine (or receive) transmission power commitment information, and can employ this information to determine automatic adjustment of transmit power on a downlink channel. For example, this can include increasing the transmit power ceiling where there is a sufficiently high probability of improving downlink performance with higher transmit power levels that would be permitted with an increased ceiling. The power ceiling determination component 310 can further determine that there is sufficient power headroom to facilitate exceeding the predefined downlink power ceiling level.

Power ceiling determination component 310 can generate power ceiling adjustment information 360. Power ceiling adjustment information 360 can be made available to other systems and components. In an aspect, power ceiling adjustment information 360 can be received, for example, at power ceiling adjustment component 190. Where power ceiling adjustment component 190 is communicatively coupled to a base station, it can facilitate automatically adjusting the power ceiling of a downlink in response to receiving power ceiling adjustment information 360. Automatically adjusting the power ceiling of the downlink channel can allow the downlink to transmit at a higher power level than would be allowed under conventional static power ceiling designation.

FIG. 4 illustrates a system 400 that facilitates generation of transmit power parameter adjustment information for a voice information channel in accordance with aspects of the subject disclosure. System 400 can include power ceiling determination component 412 that can automatically determine adjustment of a downlink transmit ceiling level. Power ceiling determination component 412 can generate power ceiling adjustment information 462 based on the determined adjustment to be made to a downlink transmit ceiling. In an aspect, this determination can be based, at least in part, on a determined performance of the downlink and a determined level of uncommitted power that can facilitate an adjustment of a downlink transmit power ceiling.

Power ceiling determination component 412 can receive voice channel signal-to-noise information 476. Voice channel signal-to-noise information 476 can be employed to determine the performance of a voice signal over a voice channel including both packet switched and circuit-switched voice channels, for example, voice channel signal-to-noise information 476 can facilitate determining the performance of a voice channel downlink between a base station and mobile device. Voice channel signal-to-noise information 476 can include metrics that, for example, can indicate that increasing the transmission power of a voice channel downlink transmission can improve the voice channel signal quality relative to signal interference.

Power ceiling determination component 412 can further receive transmission power commitment information 486. Transmission power commitment information 486 can include information related to base station utilization of available power for downlink transmissions. In an aspect, can facilitate determining how much headroom remains in the downlink transmit power that can be shifted to downlink channels allowed to exceed a predetermined ceiling power level.

Power ceiling determination component 412 can be communicatively coupled to power ceiling adjustment component 492. Power ceiling determination component 492 can facilitate adjustment of a downlink channel transmit ceiling level for a voice channel. Power ceiling determination component 492 can automatically adjust the downlink transmit ceiling level for the voice channel in response to receiving power ceiling adjustment information 462.

FIG. 5 illustrates a system 401 that generation of transmit power parameter adjustment information for a circuit-switched channel in accordance with aspects of the subject disclosure. System 401 can include power ceiling determination component 414 that can automatically determine adjustment of a downlink transmit ceiling level. Power ceiling determination component 414 can generate power ceiling adjustment information 464 based on the determined adjustment to be made to a downlink transmit ceiling. In an aspect, this determination can be based, at least in part, on a determined performance of the downlink and a determined level of uncommitted power that can facilitate an adjustment of a downlink transmit power ceiling.

Power ceiling determination component 414 can receive circuit-switched channel signal-to-noise information 478. Circuit-switched channel signal-to-noise information 478 can be employed to determine the performance of a voice or other signal over a circuit-switched channel, for example, circuit-switched channel signal-to-noise information 478 can facilitate determining the performance of a circuit-switched channel downlink between a base station and mobile device. Circuit-switched channel signal-to-noise information 478 can include metrics that, for example, can indicate that increasing the transmission power of a circuit-switched channel downlink transmission can improve the circuit-switched channel signal quality relative to signal interference.

Power ceiling determination component 414 can further receive transmission power commitment information 488. Transmission power commitment information 488 can include information related to base station utilization of available power for downlink transmissions. In an aspect, can facilitate determining how much headroom remains in the downlink transmit power that can be shifted to downlink channels allowed to exceed a predetermined ceiling power level.

Power ceiling determination component 414 can be communicatively coupled to power ceiling adjustment component 494. Power ceiling determination component 494 can facilitate adjustment of a downlink channel transmit ceiling level for a circuit-switched channel. Power ceiling determination component 494 can automatically adjust the downlink transmit ceiling level for the circuit-switched channel in response to receiving power ceiling adjustment information 464.

Figure 6:
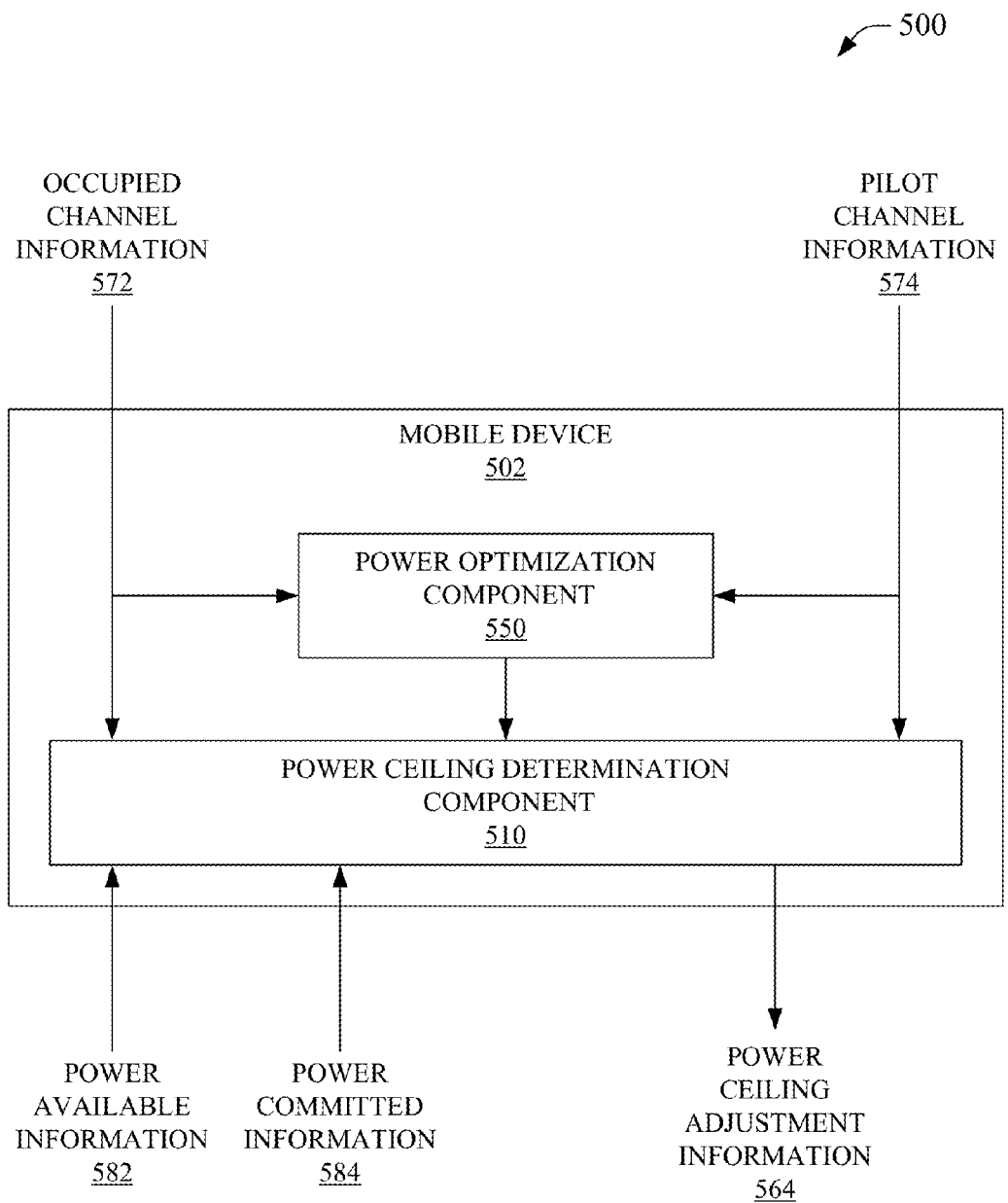
FIG. 6 illustrates a system that facilitates generation of transmit power parameter adjustment information based on an optimized transmission power level in accordance with aspects of the subject disclosure.

FIG. 6 illustrates a system 500 that facilitates generation of transmit power parameter adjustment information based on an optimized transmission power level in accordance with aspects of the subject disclosure. System 500 can include mobile device 502. System 500 can further include power ceiling determination component 510 that can automatically determine adjustment of a downlink transmit ceiling level. Power ceiling determination component 510 can generate power ceiling adjustment information based on a determined adjustment to be made to a downlink transmit ceiling. In an aspect, this determination can be based, at least in part, on a determined performance of the downlink and a determined level of uncommitted power that can facilitate an adjustment of a downlink transmit power ceiling.

Power ceiling determination component 510 can receive occupied channel information 572. Occupied channel information 572 can include signal strength, quality metrics, etc., for an occupied channel, e.g., a downlink channel between a base station and mobile device 502. Power ceiling determination component 510 can further receive pilot channel information 574. Pilot channel information 574 can include pilot signal strength, quality metrics, etc., for a pilot channel received from the base station by mobile device 502. Analysis of occupied channel information 572 relative to pilot channel information 574 can facilitate determination of signal-to-noise information, such as signal-to-noise information 170. Signal-to-noise information can be employed to determine the performance of a signal, for example, signal-to-noise information can facilitate determining the performance of a downlink between a base station and mobile device 502. Signal-to-noise information can include metrics that, for example, can indicate that increasing the transmission power of a downlink transmission can improve the signal quality relative to signal interference. Signal-to-noise information can be based on an analysis of relevant channel information. In an embodiment, power ceiling determination component 510 can receive signal-to-noise information directly from within mobile device 502 (not illustrated) rather than raw information to determine signal-to-noise information at power ceiling determination component 510 (as illustrated).

Power ceiling determination component 510 can further determine transmission power commitment information, such as transmission power commitment information 180. Transmission power commitment information can be employed to determine base station utilization of available power for downlink transmissions. Power ceiling determination component 510 can receive power available information 582 that can include information related to total available power, available link budget power, available downlink transmit power, etc. Power ceiling determination component 510 can further receive power committed information 584 that can include information related to total committed power, committed link budget power, committed downlink transmit power, etc. Power ceiling determination component 510 can facilitate determining how much headroom remains in the downlink transmit power that can be shifted to downlink channels allowed to exceed a predetermined ceiling power level. In an embodiment, power ceiling determination component 510 can receive transmission power commitment information directly (not illustrated) rather than raw information to determine transmission power commitment information (as illustrated).

Power ceiling determination component 510 can be further communicatively coupled to power optimization component 550, which can also receive signal-to-noise information or signal-to-noise information precursors including occupied channel information 572 and pilot channel information 574. Power optimization component 550 can determine one or more target downlink power levels associated with optimized performance of the channel and mobile device 502. In an aspect, optimizations can include aspects of reducing power consumption, improving battery performance, improving information carrying capacity on the channel, etc. In some embodiments, power optimization component 550 can include well known optimization techniques to generate a target downlink transmit power level. This target downlink transmit power level can be made available to power ceiling determination component 510. As an example, power optimization component 550 can determine a target downlink transmit power level to maintain the signal-to-interference ratio of the service in use on the downlink channel. Mobile device can receive a quality-of-service (QoS) parameter, fixed by a network service provider, for the signal-to-interference target associated with the service used by mobile device 502. If the received power exceeds the target, mobile device 502 can send a request to the UE to decrease the transmitted power level. If on the contrary, the received power is not enough, mobile device 502 can send a request to increase the transmitted power, in order to arrive at the desired QoS. However, where the increase in the transmitted power level exceeds the ceiling in a conventional system, the power level increase request would be refused and the QoS would not be improved. In contrast to conventional systems, this request to exceed the ceiling can be passed from power optimization component 550 to power ceiling determination component 510.

Power ceiling determination component 510 can determine that an increase in transmit power on a downlink channel has a sufficiently high probability of improving downlink performance. This can be based, at least in part, on information received from power optimization component 550. The power ceiling determination component 510 can further determine that there is sufficient power headroom to facilitate exceeding the predefined downlink power ceiling level. In response to these determinations, power ceiling determination component 510 can generate power ceiling adjustment information 560. Power ceiling adjustment information 560 can be made available to other systems and components. In an aspect, power ceiling adjustment information 560 can be received, for example, at power ceiling adjustment component 190. Where power ceiling adjustment component 190 is communicatively coupled to a base station, it can facilitate automatically adjusting the power ceiling of a downlink in response to receiving power ceiling adjustment information 560. Automatically adjusting the power ceiling of the downlink channel can allow the downlink to transmit at a higher power level than would be allowed under conventional static power ceiling designation.

Figure 7:
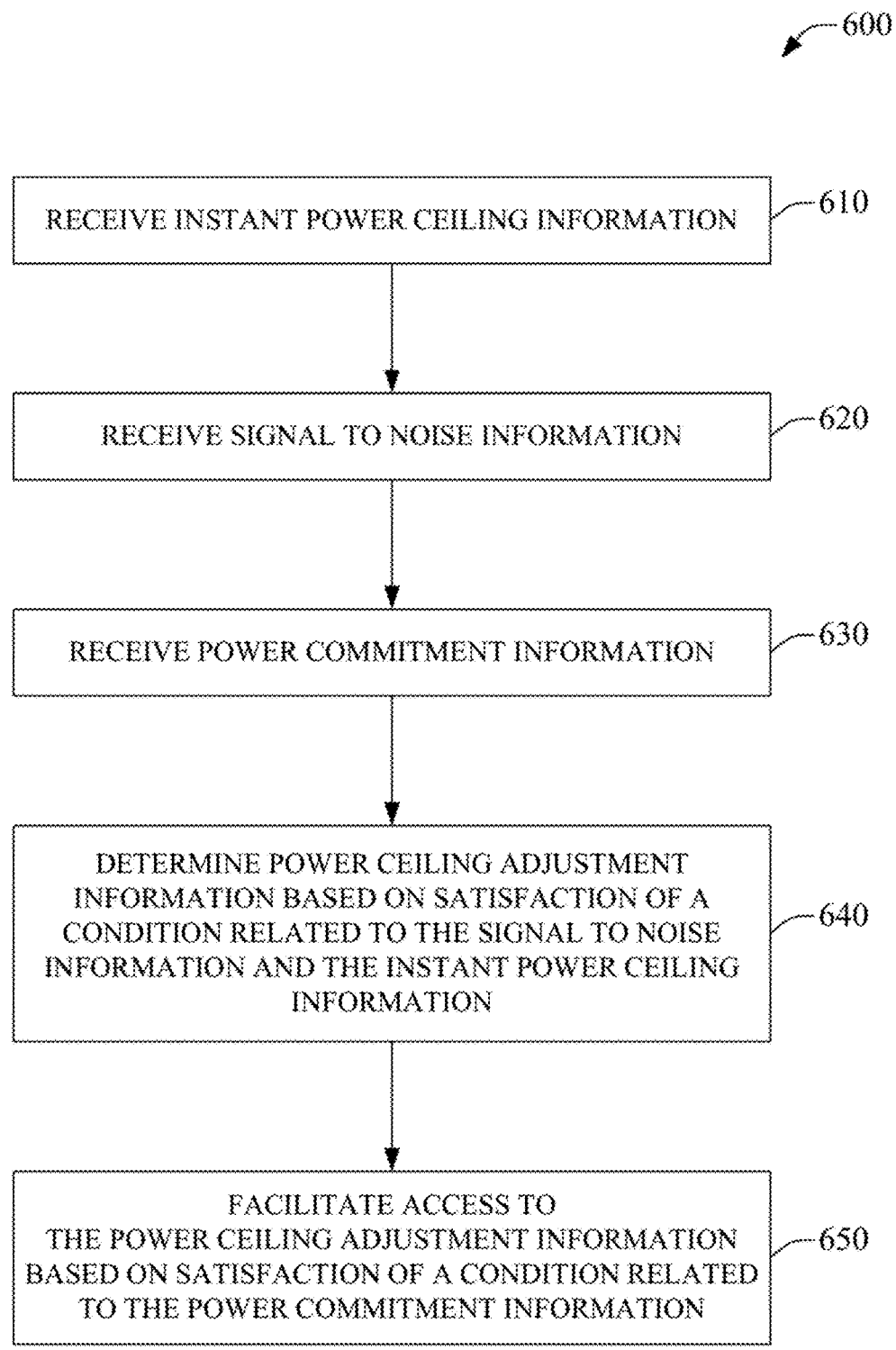
FIG. 7 illustrates a method for facilitating adjusting a transmit power parameter in accordance with aspects of the subject disclosure.
Figure 8:
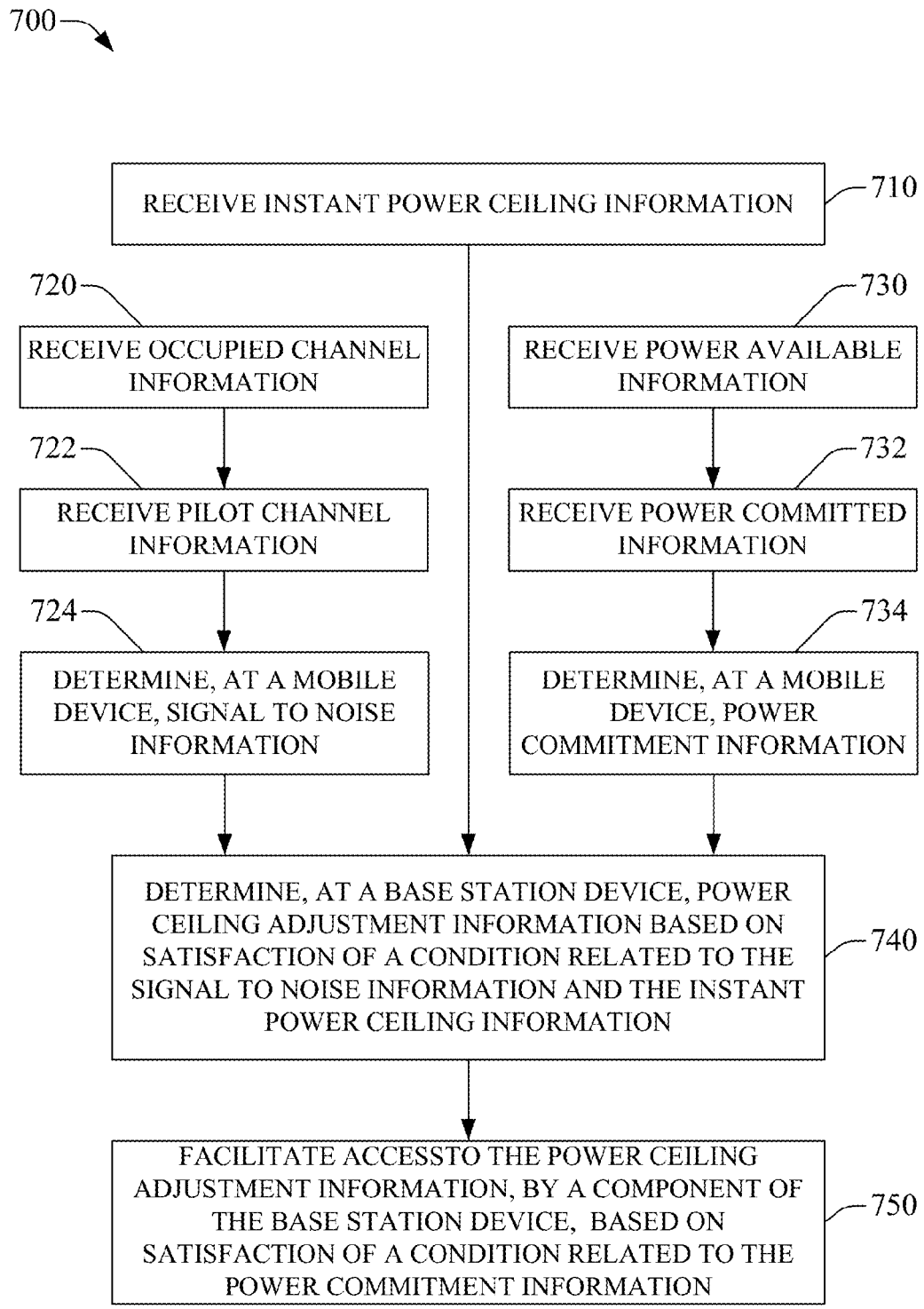
FIG. 8 illustrates a method for facilitating adjusting a transmit power parameter based on determined performance parameters in accordance with aspects of the subject disclosure.
Figure 9:
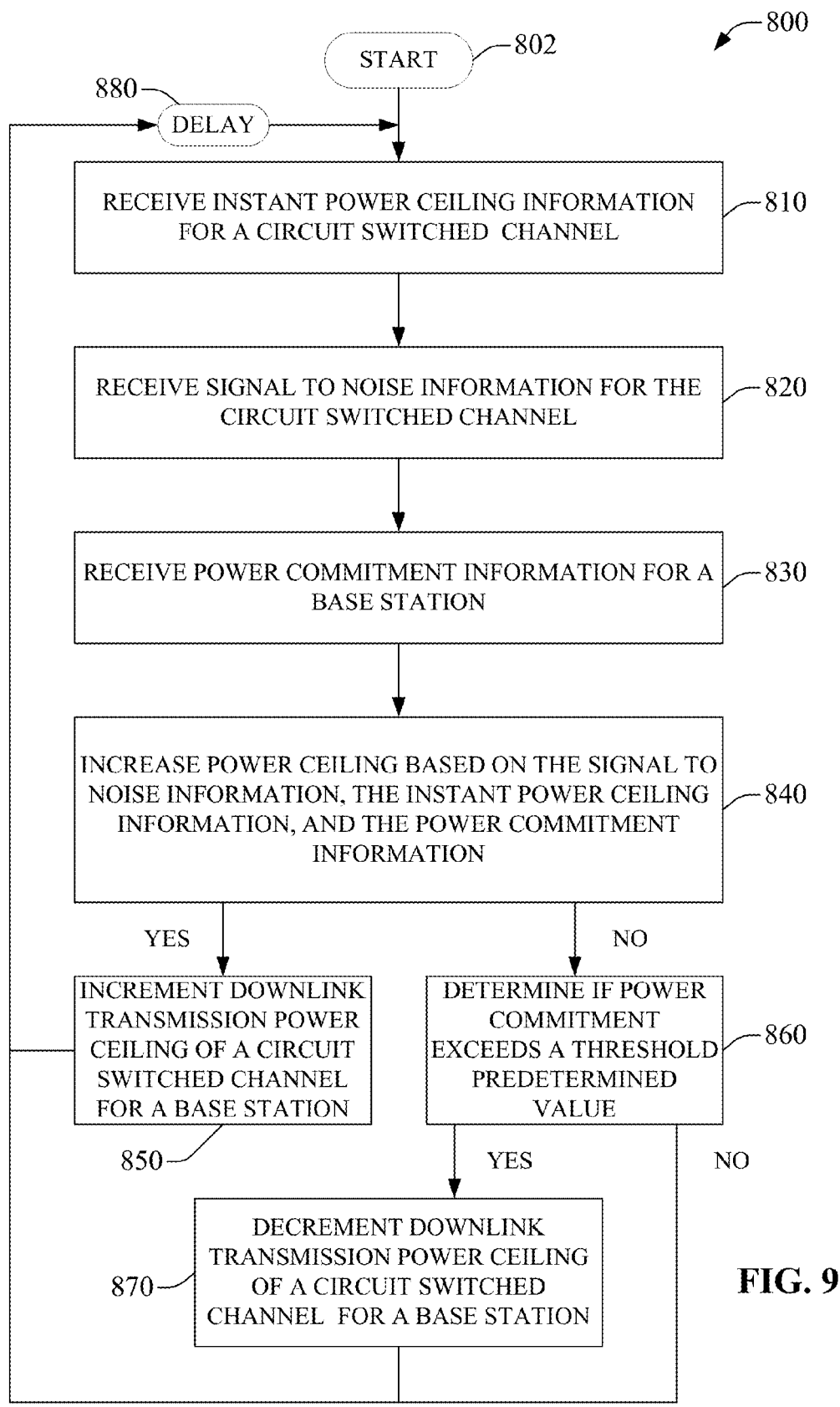
FIG. 9 illustrates a method for facilitating adjusting a transmit power parameter for a voice channel in accordance with aspects of the subject disclosure.

In view of the example system(s) described above, example method(s) that can be implemented in accordance with the disclosed subject matter can be better appreciated with reference to flowcharts in FIG. 7-FIG. 9. For purposes of simplicity of explanation, example methods disclosed herein are presented and described as a series of acts;

however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates aspects of method 600 facilitating adjusting a transmit power parameter in accordance with aspects of the subject disclosure. At 610, method 600 can include receiving instant power ceiling information. Instant power ceiling information can be related to the current designated transmit power level for a downlink channel between a base station and a mobile device.

At 620, sign-to-noise information can be received. Signal-to-noise information can include carrier-to-noise ratio information, signal-to-noise ratio information, Eb/N0 information (e.g., energy per bit relative to noise power spectral density), signal-to-interference information, Es/N0 (ESNO) information (e.g., energy per symbol relative to noise power spectral density), C/N0 information (e.g., carrier to receiver noise density), etc. Signal-to-noise information can be employed to determine the performance of a signal, for example, signal-to-noise information can facilitate determining the performance of a downlink between a base station and mobile device. Signal-to-noise information can include metrics that, for example, can indicate that increasing the transmission power of a downlink transmission can improve the signal quality relative to signal interference.

At 630, power commitment information can be received. Power commitment information can be the same as or similar to transmission power commitment information. Transmission power commitment information can include information related to base station utilization of available power for downlink transmissions. In an aspect, transmission power commitment information can include metrics for total available power, total link budget power, total downlink transmit power, committed power, committed link budget power, committed downlink transmit power, available power, available link budget power, available downlink transmit power, etc. Transmission power commitment information can facilitate determining a difference between total or available downlink transmit power and committed downlink transmit power. This difference can be referred to by the term 'headroom' herein. In an embodiment, downlink transmit power headroom can represent the amount of uncommitted downlink transmit power available for a base station. As such, transmission power commitment information can facilitate determining downlink transmit power headroom that can be committed by downlink channels allowed to exceed a predetermined ceiling power level.

At 640, method 600 can include determining power ceiling adjustment information. At this point, method 600 can end. Power ceiling adjustment information can be determined based on satisfaction of a condition related to the signal-to-noise information and the instant power ceiling information. As an example, power ceiling adjustment information can include an indicator value related to not increasing downlink transmission ceiling power where signal-to-noise information is indicative of no significant benefit from increasing downlink transmission power levels. As a further example, power ceiling adjustment information can include an indicator value related to increasing downlink transmission power levels where signal-to-noise information is indicative of improved performance in the downlink performance related to an increase in the transmission power of the downlink channel and where the indicated adjustment to the ceiling would exceed the instant ceiling value.

At 650, access to the power ceiling adjustment information can be facilitated based on satisfaction of a condition related to the power commitment information. Where the power commitment is at or near a predetermined threshold level, the condition can fail to be satisfied and access to the power ceiling adjustment information can be restricted. However, where the power commitment information is indicative of sufficient uncommitted transmission power, the condition can be satisfied and access to the power ceiling adjustment information can be allowed. As an example, where 10% of available transmission power for a base station is committed and the threshold level is a value greater than 45%, the condition can be satisfied and access to the power ceiling adjustment information can be allowed. Continuing the example, this can result in the downlink channel ceiling being elevated and correspondingly committing more transmit power.

FIG. 8 illustrates a method 700 that facilitates adjusting a transmit power parameter based on determined performance parameters in accordance with aspects of the subject disclosure. At 710, method 700 can include receiving instant power ceiling information. Instant power ceiling information can be related to the current designated transmit power level for a downlink channel between a base station and a mobile device.

At 720, occupied channel information can be received. Occupied channel information can include signal strength, quality metrics, etc., for an occupied channel, e.g., a downlink channel between a base station and mobile device. At 722, pilot channel information can be received. Pilot channel information can include pilot signal strength, quality metrics, etc., for a pilot channel received from the base station by mobile device. In an aspect, pilot channel information can be associated with the common pilot channel, such as CPICH, which can include a downlink channel broadcast by a NodeB at a constant power and with a known bit sequence. At 724, sign-to-noise information can be determined, at a mobile device, based, at least in part, on the occupied channel information and the pilot channel information. Analysis of occupied channel information relative to pilot channel information can facilitate determination of signal-to-noise information. Signal-to-noise information can be employed to determine the performance of a signal, for example, signal-to-noise information can facilitate determining the performance of a downlink between a base station and mobile device. Signal-to-noise information can include metrics that, for example, can indicate that increasing the transmission power of a downlink transmission can improve the signal quality relative to signal interference.

At 730, power available information can be received. Power available information that can include information related to total available power, available link budget power, available downlink transmit power, etc. At 732, power committed information can be received, which can include information related to total committed power, committed link budget power, committed downlink transmit power, etc. At 734, power commitment information can be determined, at a mobile device, based, at least in part, on power available information and power committed information. Power commitment information can be the same as or similar to transmission power commitment information. Transmission power commitment information can include information related to base station utilization of available power for downlink transmissions. In an aspect, transmission power commitment information can include metrics for total available power, total link budget power, total downlink transmit power, committed power, committed link budget power, committed downlink transmit power, available power, available link budget power, available downlink transmit power, etc. In a further aspect, transmission power commitment information can be employed to facilitate determining how much headroom remains in the downlink transmit power of a base station that can be shifted to downlink channels allowed to exceed a predetermined ceiling power level.

At 740, method 700 can include determining, at a base station, power ceiling adjustment information. At this point, method 700 can end. Power ceiling adjustment information can be determined, at a base station, based on satisfaction of a condition related to the signal-to-noise information and the instant power ceiling information.

At 750, access to the power ceiling adjustment information, by a component of the base station, can be based on satisfaction of a condition related to the power commitment information. Where the power commitment is at or near a predetermined threshold level, the condition can fail to be satisfied and access to the power ceiling adjustment information can be restricted. However, where the power commitment information is indicative of sufficient uncommitted transmission power, the condition can be satisfied and access to the power ceiling adjustment information can be allowed.

FIG. 9 illustrates a method 800 that facilitates adjusting a transmit power parameter for a circuit-switched channel in accordance with aspects of the subject disclosure. Method 800 can begin at 802. At 810, method 800 can include receiving instant power ceiling information for a circuit-switched channel. Instant power ceiling information for the circuit-switched channel can be related to the current designated transmit power level for a circuit-switched downlink channel between a base station and a mobile device.

At 820, sign-to-noise information can be received for the circuit-switched channel. Signal-to-noise information can be employed to determine the performance of a signal, for example, signal-to-noise information can facilitate determining the performance of a downlink between a base station and mobile device for a circuit-switched channel. Signal-to-noise information can include metrics that, for example, can indicate that increasing the transmission power of a downlink transmission can improve the circuit-switched channel signal quality relative to signal interference.

At 830, power commitment information can be received. Power commitment information can be the same as or similar to transmission power commitment information. Transmission power commitment information can include information related to base station utilization of available power for downlink transmissions. In an aspect, transmission power commitment information can include metrics for total available power, total link budget power, total downlink transmit power, committed power, committed link budget power, committed downlink transmit power, available power, available link budget power, available downlink transmit power, etc. In a further aspect, transmission power commitment information can be employed to facilitate determining how much headroom remains in the downlink transmit power of a base station that can be shifted to downlink channels allowed to exceed a predetermined ceiling power level.

At 840, method 800 can determine if the power ceiling for a circuit-switched channel should be increased. Determining if power ceiling adjustment information should be increased can be based on satisfaction of a condition related to the signal-to-noise information and the instant power ceiling information. As an example, power ceiling adjustment information can include an indicator value related to not increasing downlink transmission ceiling power for a circuit-switched channel where signal-to-noise information is indicative of no significant benefit from increasing downlink transmission power levels. As a further example, power ceiling adjustment information can include an indicator value related to increasing downlink transmission power levels for the circuit-switched channel where signal-to-noise information is indicative of improved performance in the downlink performance related to an increase in the transmission power of the downlink channel and where the indicated adjustment to the ceiling would exceed the instant ceiling value. Where increasing the power ceiling is determined in the affirmative, method 800 continues at 850.

At 850, the downlink transmission power ceiling for a circuit-switched channel can be incremented at the base station. Incrementing the transmission power ceiling can be in predetermined incremental steps, such as, 1 dBm steps, 5% steps, 10 mW steps, etc. Method 800 can proceed to delay 880 before returning to 810 for an additional iteration.

Where increasing the power ceiling is determined in the negative at 840, method 800 continues at 860. At 860, it can be determined if power commitment exceeds a threshold predetermined value. Where the power commitment levels exceed the threshold predetermined level, the condition can be satisfied in the affirmative. However, where the power commitment information is indicative of sufficient uncommitted transmission power, the condition can fail to be satisfied, delivering a negative result. As an example, where 10% of available transmission power for a base station is committed and the threshold level is a value greater than 45%, the condition will not be satisfied and a negative indicator will be result. Where the determination at 860 is a negative result, method 800 continues to delay 880 before returning to 810 for another iteration. Where the determination at 860 is an affirmative result, method 800 continues to 870.

At 870, the downlink transmission power ceiling for a circuit-switched channel can be decremented at the base station. Decrementing the transmission power ceiling can be in predetermined decremental steps, such as, −1 dBm steps, −5% steps, −10 mW steps, etc. Method 800 can then proceed to delay 880 before returning to 810 for an additional iteration.

In an aspect, method 800 can act as a feedback loop facilitating the automatic adjustment of downlink transmit power ceiling levels. Information is gathered at 810-830 for decision making. At 840 it is decided, based on signal-to-noise information, the then current power ceiling, and power commitment information, if the downlink transmit power ceiling level should be increased. If it is to be increased, it is increased at 850, before returning for the next iteration of the loop after any appropriate delay. If it is not to be increased, then at 860 it is determined if the failure to increase is due to too much power already being committed. If it is found that too much power is already committed at 860, then at 870, the downlink transmit power ceiling level is decreased to reduce the level of commitment before returning for the next iteration of the loop. However, if the failure to increase the downlink transmit power ceiling level was not due to the level of power committed, then there is no need to decrease the committee power and method 800 can begin the next iteration.

Figure 10:
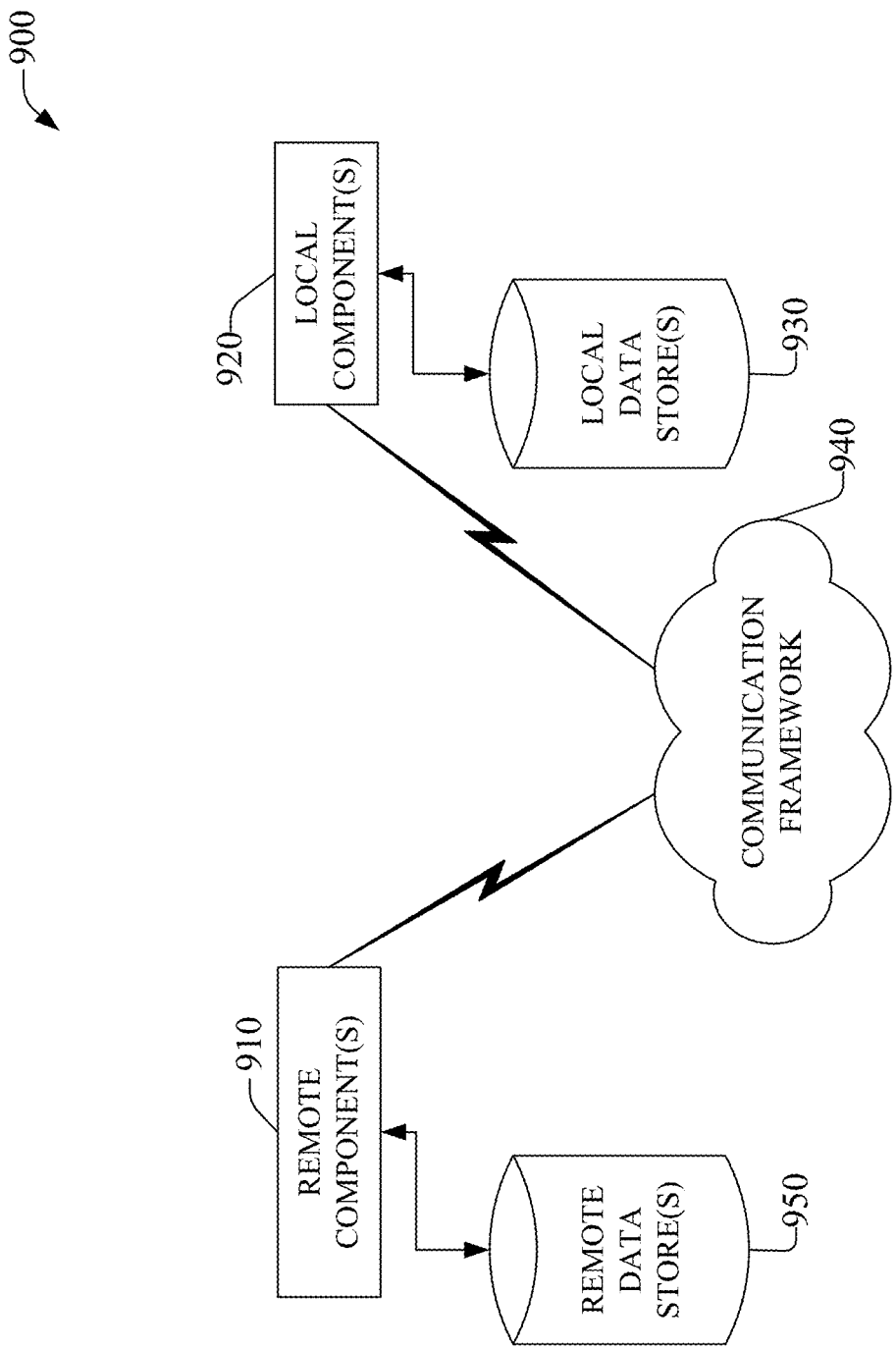
FIG. 10 depicts a schematic block diagram of a computing environment with which the disclosed subject matter can interact.

FIG. 10 is a schematic block diagram of a computing environment 900 with which the disclosed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include mobile devices, such as smartphones, tablet computers, laptop computers, etc. As an example, remote component(s) 910 can be a mobile phone comprising a power ceiling determination component 110.

The system 900 also includes one or more local component(s) 920, which can include server-side component(s). The local component(s) 920 can be hardware and/or software (e.g., threads, processes, computing devices). In some embodiments, local component(s) 920 can include base stations, such as NodeBs, eNodeBs, etc. As an example, local component(s) 920 can be a NodeB of a RAN of a wireless telecommunications provider.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. As an example, voice information can be communicated over a circuit-switched channel to a mobile device, e.g., remote component 910, over an air interface from a base station, e.g., a local component 920, such as on a circuit-switched downlink channel. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950 that can be employed to store information, such as signal-to-noise information 170, on the remote component(s) 910 side of communication framework 940. Similarly, local component(s) 920 can be operably connected to one or more local data store(s) 930 that can be employed to store information, such as transmission power commitment information 180, on the to the local component(s) 920 side of communication framework 940.

Figure 11:
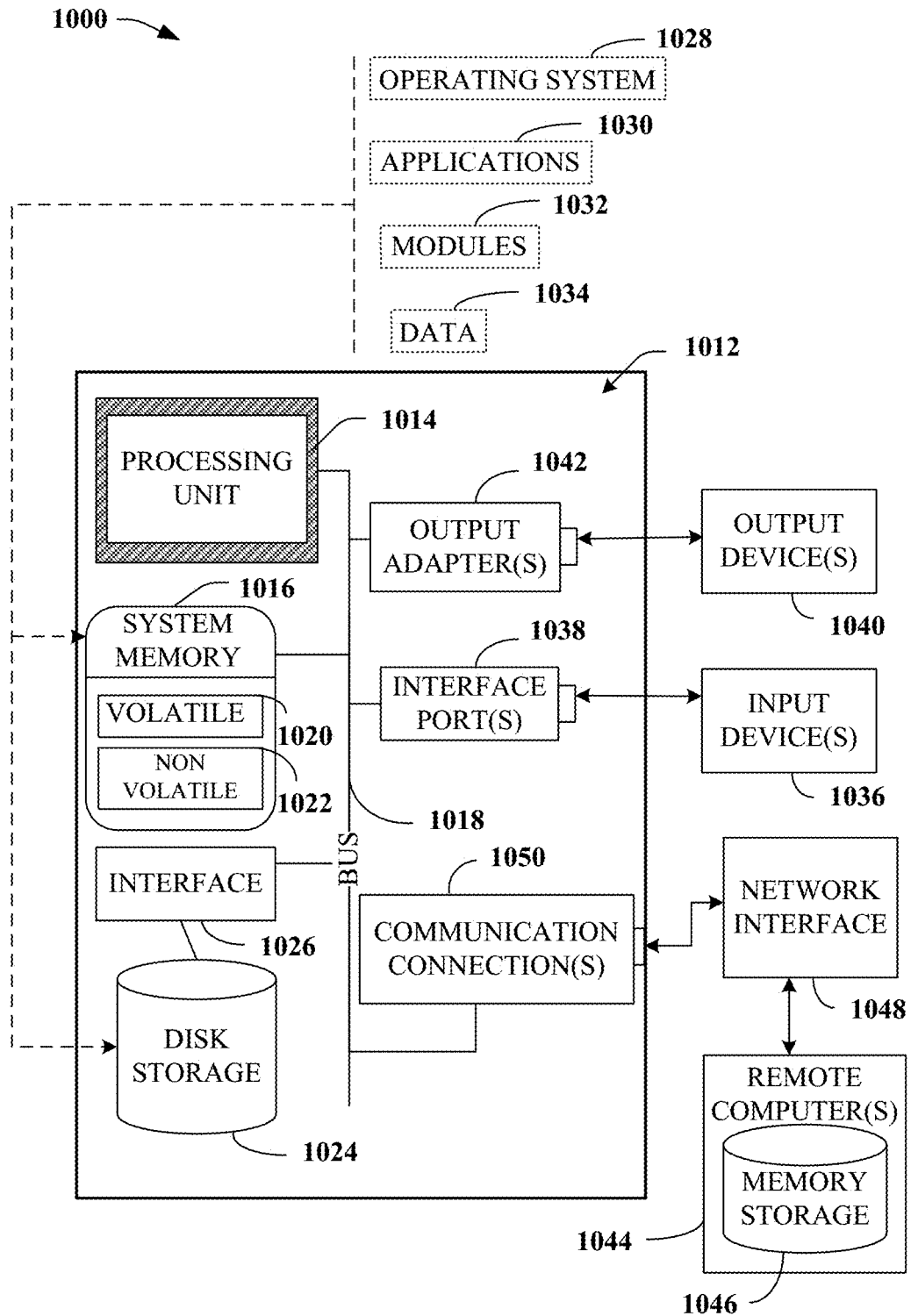
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1000 operable to execute the disclosed systems and methods in accordance with an embodiment. Computer 1012, which can be, for example, part of the hardware of a power ceiling determination component (e.g., 110, 210, 310, etc.), mobile device 202 or 502, base station 304, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, user interface 512 can be embodied in a touch sensitive display panel allowing a user to interact with computer 1012, e.g., where computer 1012 comprises costing component 520. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber linemodems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc; femto-cell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
  a processor; and
  a memory that stores executable instructions that, when executed by the processor, facilitate performance of operations, comprising:
    determining an adaptation of an upper limit for a power level associated with a wireless communications channel between a base station device and a user equipment based on a quality of service condition and a power condition associated with the wireless communication channel; and
    in response to information related to the adaptation of the upper limit for the power level being determined to have been accessed by the base station device, enabling the adaptation.

2. The system of claim 1, wherein the system is part of the user equipment.

3. The system of claim 1, wherein the system is part of the base station device.

4. The system of claim 1, wherein voice traffic is carried via the wireless communication channel.

5. The system of claim 1, wherein the enabling the adaptation of the upper limit for the power level results in the wireless communication channel having a higher power level than another wireless communication channel associated with the base station device.

6. The system of claim 1, wherein the enabling the adaptation of the upper limit for the power level results in an adapted upper limit, and wherein a transmit power associated with the wireless communication channel is adjusted to another power level that is less than the adapted upper limit.

7. The system of claim 1, wherein the determining the adaptation of the upper limit is further based on overall power commitment information related to an aggregation of power committed to wireless communications channels associated with the base station device, comprising the wireless communications channel.

8. The system of claim 1, wherein the determining the adaptation of the upper limit is further based on determining a probability of performance improvement, the probability being related to a correlation between the quality of service condition and the power condition.

9. A method, comprising:
  determining, by a system comprising a processor, an adaptation of an effective maximum power level associated with a wireless communications channel between a base station device and a user equipment based on a quality of service condition and a power condition associated with the wireless communications channel; and enabling, by the system, the adaptation of the effective maximum power level based on access to information related to the adaptation of the effective maximum power level.

10. The method of claim 9, wherein the user equipment comprises the system.

11. The method of claim 9, wherein the base station device comprises the system.

12. The method of claim 9, wherein the wireless communication channel carries voice traffic.

13. The method of claim 9, wherein the enabling the adaptation of the effective maximum power level results in the wireless communication channel having a higher power level than another wireless communication channel associated with the base station device.

14. The method of claim 9, wherein the enabling the adaptation of the effective maximum power level results in an adapted effective maximum power level, and wherein the enabling the adaptation of the effective maximum power level comprises enabling a transmit power associated with the wireless communication channel to be adjusted to an adjusted power level that is less than the adapted effective maximum power level.

15. The method of claim 9, wherein the determining the adaptation of the effective maximum power level is further based on total power commitment information related to a total power commitment for wireless communications channels associated with the base station device, comprising the wireless communications channel.

16. The method of claim 9, wherein the determining the adaptation of the effective maximum power level is further based on determining a level of improvement in the quality of service condition that is correlated to a change in the power condition.

17. A non-transitory machine-readable storage medium, comprising executable instructions that, when executed by a processor, facilitate performance of operations, comprising:
determining an adaptation of a peak power level associated with a wireless communications channel between a base station device and a mobile device based on an interference condition and an power condition associated with the wireless communications channel; and
enabling the adaptation of the peak power level based on information related to the adaptation of the peak power level being determined to have been accessed by a base station device.

18. The non-transitory machine-readable storage medium of claim 17, wherein the wireless communication channel is employed in voice traffic transmission.

19. The non-transitory machine-readable storage medium of claim 17, wherein the enabling the adaptation of the peak power level results in the wireless communication channel having a higher power level than another wireless communication channel associated with the base station device.

20. The non-transitory machine-readable storage medium of claim 17, wherein the determining the adaptation of the peak power level associated with the wireless communications channel is further based on overall power commitment information related to a total power commitment for wireless communications channels associated with the base station device, including the wireless communications channel.

\* \* \* \* \*